United States Patent
Irisarri Navalpotro

(10) Patent No.: US 7,938,271 B2
(45) Date of Patent: May 10, 2011

(54) METHOD FOR PREPARING POWDERED STILL SLOPS, RESULTING MATERIAL AND FACILITY FOR PREPARING SUCH POWDERED STILL SLOPS

(75) Inventor: Daniel Irisarri Navalpotro, Laukiz (ES)

(73) Assignee: HPD Process Engineering, S.A., Getxo (ES)

( * ) Notice: Subject to any disclaimer, the term of this patent is extended or adjusted under 35 U.S.C. 154(b) by 885 days.

(21) Appl. No.: 11/910,734

(22) PCT Filed: Apr. 6, 2005

(86) PCT No.: PCT/ES2005/000177
§ 371 (c)(1),
(2), (4) Date: Oct. 4, 2007

(87) PCT Pub. No.: WO2006/108884
PCT Pub. Date: Oct. 19, 2006

(65) Prior Publication Data
US 2008/0190416 A1    Aug. 14, 2008

(51) Int. Cl.
*C12F 3/10* (2006.01)
*C02F 1/12* (2006.01)
*C02F 5/00* (2006.01)

(52) U.S. Cl. ........ 209/11; 209/12.1; 209/725; 159/4.01; 159/4.02; 71/26; 34/360; 34/361; 34/371; 34/576; 34/577; 34/592; 34/594; 34/62

(58) Field of Classification Search .............. 209/11, 209/12.1, 725; 159/4.01, 4.02; 71/26; 34/360, 34/361, 371, 576, 577, 592, 594, 62
See application file for complete search history.

(56) References Cited

U.S. PATENT DOCUMENTS

| | | | | |
|---|---|---|---|---|
| 2,375,288 A | * | 5/1945 | Wolcott | 34/361 |
| 3,721,568 A | | 3/1973 | Wilson | |

FOREIGN PATENT DOCUMENTS

| | | |
|---|---|---|
| ES | 2 059 283 A1 | 11/1994 |
| ES | 2 113 820 A1 | 5/1998 |
| GB | 27300 | 0/1913 |
| GB | 439595 A | 12/1935 |

OTHER PUBLICATIONS

Translation of the Written Opinion for PCT/ES2005/000177, Jan. 2008.*

* cited by examiner

*Primary Examiner* — David A Reifsnyder
(74) *Attorney, Agent, or Firm* — Knobbe Martens Olson & Bear LLP

(57) ABSTRACT

This consists of the preparation of powdered still slops from concentrated liquid still slops dried and converted into a powder in a conventional dryer (1) and then fed to a powder collecting cyclone (4), featuring at the lower outlet aperture of the collecting cyclone (4) a circular or snail-shaped or logarithmic spiral-shaped device (7) fed with a cool, dry air draught which generates a downward suction effect counter to the upward suction effect of the collecting cyclone (4), bringing about the falling and separation of the powder from the draught of hot air which carries the same. The cool, dry air carries the powder to the exterior for bagging, and the hot air exits upwards via the collecting cyclone (4) towards the flue (6), using a device for the recovery of the heat which it still bears as much as possible.

6 Claims, 3 Drawing Sheets

METHOD FOR PREPARING POWDERED STILL SLOPS, RESULTING MATERIAL AND FACILITY FOR PREPARING SUCH POWDERED STILL SLOPS

RELATED APPLICATIONS

This application is a U.S. National Phase of International Application No. PCT/ES2005/000177, filed Apr. 6, 2005, designating the U.S. and published not in English on Oct. 19, 2006 as WO 2006/108884. The content of this application is incorporated herein by reference in its entirety.

OBJECT OF THE INVENTION

This invention relates to the field of the liquid still slops produced from the distillation of fermented sugars with the aim of producing alcohol or yeasts.

The object of the invention is a procedure for the execution of the drying and transformation of concentrated liquid still slops in order to produce the same in powdered format, free of contamination and easily manageable, which allows its storage in sacks.

Another object of the invention is the powdered still slops in themselves, produced by means of this procedure.

The facility, incorporating means associated with a cyclone for collecting the powder obtained from the concentrated liquid still slops is likewise the object of this invention.

BACKGROUND OF THE INVENTION

Still slops consist of a by-product derived from the distillation of fermented sugars with the aim of producing alcohol or yeasts. The sugars for distillation may come from vegetable juices (sugar cane, beet, maize, cereals, grapes, etc.), from molasses, which are by-products formed in the production of sugar, or from intermediate honey.

The still slops produced, due to their high organic load, ferment with the greatest of ease, and their fermentation is aerobic; for this reason their BOD (Biochemical Oxygen Demand) load is very high and they consume all the oxygen in their surroundings, destroying the biosystem. For this reason they are listed as highly pollutant waste.

Still slops consist at origin of a significant quantity of water and a small percentage of soluble and insoluble solids.

The insoluble solids are mainly sulphates, such as calcium sulphate or plaster in a greater percentage, potassium sulphate, etc. and some other salts which depend on the starting vegetable material, and also the yeasts which have been used for the fermentation of the sugars.

The Spanish patent ES 2 158 751 discloses a procedure for the preparation of polymeric complexes from effluent by-products of distilleries; these normally consist of still slops.

A high percentage of the soluble solids are of an organic nature; this also depends on the starting vegetable material, but it is usually in the region of 85% to 90%, and these together are a polymeric complex. The remaining percentage is of an inorganic nature, comprised of salts of potassium, manganese, calcium, etc.

The volumes of concentrated still slops produced in distilleries are very high and require important and highly costly logistics using tanks; all of this makes their use in locations some distance from the point of production unprofitable.

In practice, it may be seen that manipulation of the concentrated liquid still slops is difficult, basically because it requires storage tanks at the locations at which it is desired to carry this out, and it entails, apart from the drawbacks derived from costly outlays and the handling of a viscous liquid (between 180 and 250 cps), the latent danger of contamination of the liquid by a yeast spore or by any bacteria.

Still slops, due to their pH—approximately 4.5—and their organic acids, are corrosive, and require preferably stainless steel tanks, which entails a heavy outlay, as carbon steel tanks have a relatively short life as they are destroyed by the heavy corrosion, or require highly expensive maintenance as they must be cleaned thoroughly and coated with special paints every few years.

It should be highlighted that concentrated still slops are organic matter in their vast majority, and although in strong concentrations contamination by bacteria, fungi and yeast does not spread easily, effects as simple as warm temperatures and condensation in the storage tanks can unleash heavy contamination which spreads in a short time interval.

This contamination first generates heavy emissions of carbon dioxide, and thick layers of fungi on the surfaces of the tanks. When the contaminated liquid is used, the bacteria contained in the same spread to the locations where the liquid is applied.

The only way of preventing these contaminations is by means of the use of potent biocides, which are highly costly, and the majority of which are to be banned due to their carcinogenic characteristics (formol, for example) and another particularity is that their effects are short-term and it is necessary to repeat their application frequently.

On the other hand, concentrated liquid still slops tend to decant their dissolved solids which flocculate constantly, and to deposit their organic matter on the base of the tank, creating a sludge which is rich in organic matter; this makes it very difficult for the richness or characteristics of the liquid to be constant and known. This richness or uniformity of content varies in accordance with the height of the tank, the time the still slops have been stored, the ambient temperature, etc. and the consequence is that at different layers or levels in the tank the characteristics of the still slops are different. Accordingly, the handling of these still slops stored in a vessel is banned at well-defined formulations. They are only valid for blends in proportions in which the variations in this component are not of great importance as they are applied in flood irrigation or similar applications.

Furthermore, concentrated liquid still slops contain a percentage of water of approximately 50%, which prevents their use for the majority of formulations.

The aforementioned difficulties regarding transport, storage, preservation and formulation prevent the use of concentrated liquid still slops in a host of applications which would represent a practical, productive use for this product; among these the following may be highlighted:

Uses in industry as textile colorants, in leather as tanning agents and colorants, etc.

Uses in agriculture accompanying crystalline-soluble fertilisers and chemical granules, among others.

Uses as an enhancer of animal food absorption, for example in pig farms.

Uses in human nutrition in hot and cold food and drinks, likewise in medicine for easing intestinal functions, among other uses.

With regard to the drying of the still slops, likewise the powder produced when hot and damp, there must be no contact between the powder and any artefact not at speed, as the powder will be deposited on it and will adhere firmly, subsequently collecting the powder which continues to arrive. The powder must be in continuous movement and must, during its journey or transport in motion, be dried and cooled, which requires that there shall not be artefacts which interrupt its speed until its temperature and humidity so permit.

It is well-known that a cyclone consists of a body in the shape of an inverted cone, into which an air draught enters tangentially, carrying the powder. A downward air draught, also called cyclone, is generated towards the vertex of the cyclone, and the solid particles descend, sliding down the wall, while spinning at great speed. When the cyclone-shaped air draught reaches the bottom or zone of the vertex of the cone, it is absorbed upwards by the cyclone at the centre or axis of the cone. It is necessary for cyclones to be closed at the bottom in order to prevent the entry of air which would be sucked by the cyclone and which would draw the powder towards the top and out of the cyclone, preventing collection of the powder.

If the bottom of the artefact or zone of the vertex is closed or features a closed tray connected at this point, the powder falls into the tray and the air moves upward at the centre of the artefact and exits at the top towards an evacuation flue.

In the case of the still slops, if the cyclone were to have at its base a closed tray or a rotary shut-off valve, the powder would be halted and, due to being in contact with the device or the tray, would become compacted, producing a block of hard, compacted powder which would eventually block the cyclone, and should the powder not be removed, it would be drawn up to the flue by the air draught.

DESCRIPTION OF THE INVENTION

The procedure and associated facility proposed in this invention for the drying and transformation into powder of concentrated liquid still slops solves the problem outlined above by means of the solution of incorporating a closing system at the bottom of a powder collecting cyclone which does not come into contact with the powder, it being simply a swirling air draught which counters the cyclone suction draught, thus acting as a rotary shut-off valve.

It is therefore necessary that at the bottom or vertex of the cyclone there should be no contact between the powder and any element, and that the powder should be evacuated from the cyclone; also that the powder should be cooled in the absence of moisture, as the powder is highly hygroscopic and if it absorbs moisture it reverts to a sticky paste.

To do this, it is necessary to create an air draught formed like a cyclone or whirlpool, by means of a duct located around the outlet aperture of the cyclone, which counters the suction draught of the cyclone and which consists of dry air with a Relative Humidity of approximately 15% to 40% and at a temperature of approximately 18° to 35° C.

The air drawn into the aforementioned duct is a dry air produced by means of a cooler of industrial manufacture in order to lower its temperature to dewpoint, releasing the water in suspension, subsequently, this air is heated sufficiently to lower the relative humidity.

The aforementioned duct is of a circular configuration, in the shape of a snail or a logarithmic spiral and it generates a whirlpool-like air draught at the lower aperture of the collecting cyclone, opposing the suction effect of the cyclone which would tend to raise the powder, thus achieving the opposite effect, that is, the falling of the powder.

The dry air enters via the external inlet of said duct and exits the same via a central outlet which coincides with the lower aperture of the collecting cyclone. Thus, two draughts or "air cyclones" are to be found at the vertex of the cyclone; these counter each other and cause the upper powder collecting cyclone to deliver the powder towards a discharge aperture located below the central outlet of the duct and cause the outgoing dry air draught, like a cyclone, to draw the powder with it, to cool the same without moistening it, and to transport it to a place where it may be handled and bagged.

The installation is complemented by an inverted conical disc, located at the bottom of and inside the cyclone, which leaves a space of 2 to 4 centimeters approximately between its edge and the wall of the cyclone, so that the powder may slide down towards the discharge aperture and subsequently be evacuated. The air of the cyclone glides over the upper side of the conical disc and is drawn towards the axis of the cyclone and upwards, to be directed towards a flue.

The procedure for the obtaining of the powdered still slops progresses according to the following steps:

- The input of a preset flow of concentrated liquid still slops into a hot-air dryer. The concentrated liquid still slops are pulverised, atomised or converted by any means into small portions which dry out when in contact with the hot air. The powder into which these small portions are converted falls into the dryer and is drawn by the air draught towards a collecting cyclone.
- The input into a collecting cyclone of the hot air draught, with the powder.
- The input into the lower aperture of the cyclone of a second air draught, this air being dry, cool and whirlpool-like; this generates a downward suction effect counter to the upward suction effect of the cyclone, causing the falling and separation of the powder from the hot air draught, without halting the powder or bringing it into contact with any closing device.
- Transport to the bagging zone of the powder within the dry, cool air draught, in which the powder cools and is not moistened.

By means of this procedure a new powdered product, which may or may not contain insoluble solids, may be produced.

In the case of powdered still slops with insoluble solids, it may embody the following composition:

Organic matter: 50-80%
Inorganic matter: 20-50%

And with a humidity of between 1 and 8%.

In the case of powdered still slops without insoluble solids, it may embody the following composition:

Organic matter: 60-90%
Inorganic matter: 15-35%

And with a humidity of between 1 and 8%.

The advantages derived from the production of powdered still slops are listed below:

- It provides a solution for the complicated handling and the costly handling logistics of concentrated liquid still slops, transforming them into an easily manageable powder for their subsequent storage in sacks or bagging.
- It provides a solution for the complexity and cost of storage of the concentrated liquid still slops; as these are transformed into powder and accommodated in sacks, they may be stored in any covered place.
- It provides a solution for the problem of contamination of the concentrated still slops, as the drying and powdering process is non-contaminating, and once stored in duly protected sacks they are protected from any contamination.
- It allows a convenient and simple use of the powdered still slops in any formulation, as their characteristics are constant and well-defined, and as they lack their 50% of water, they may be formulated as convenient, in any proportion, in liquid, pasty or dry formulations in total safety.

It allows their use in a widespread market, that being the market of human consumption, using the still slops in hot and cold foods and drinks, and also in medicine, for easing intestinal functions among other uses.

The facility described would be likewise applicable for the collection in cyclones, without any elements of contact, of the powder produced from sugar-loaded liquids and clinging liquids in general.

DESCRIPTION OF THE DRAWINGS

To complement the description which is being made, and with the purpose of contributing to a better understanding of the characteristics of the invention, in accordance with a preferred embodiment of the same, a set of drawings with an illustrative and non-limitative character is attached as an integral part of said description, in which the following is portrayed.

PREFERRED EMBODIMENT OF THE INVENTION

With reference to the figures, a preferred embodiment of the facility for the production of powdered still slops, which is the object of the invention, is disclosed below.

Figure 1:
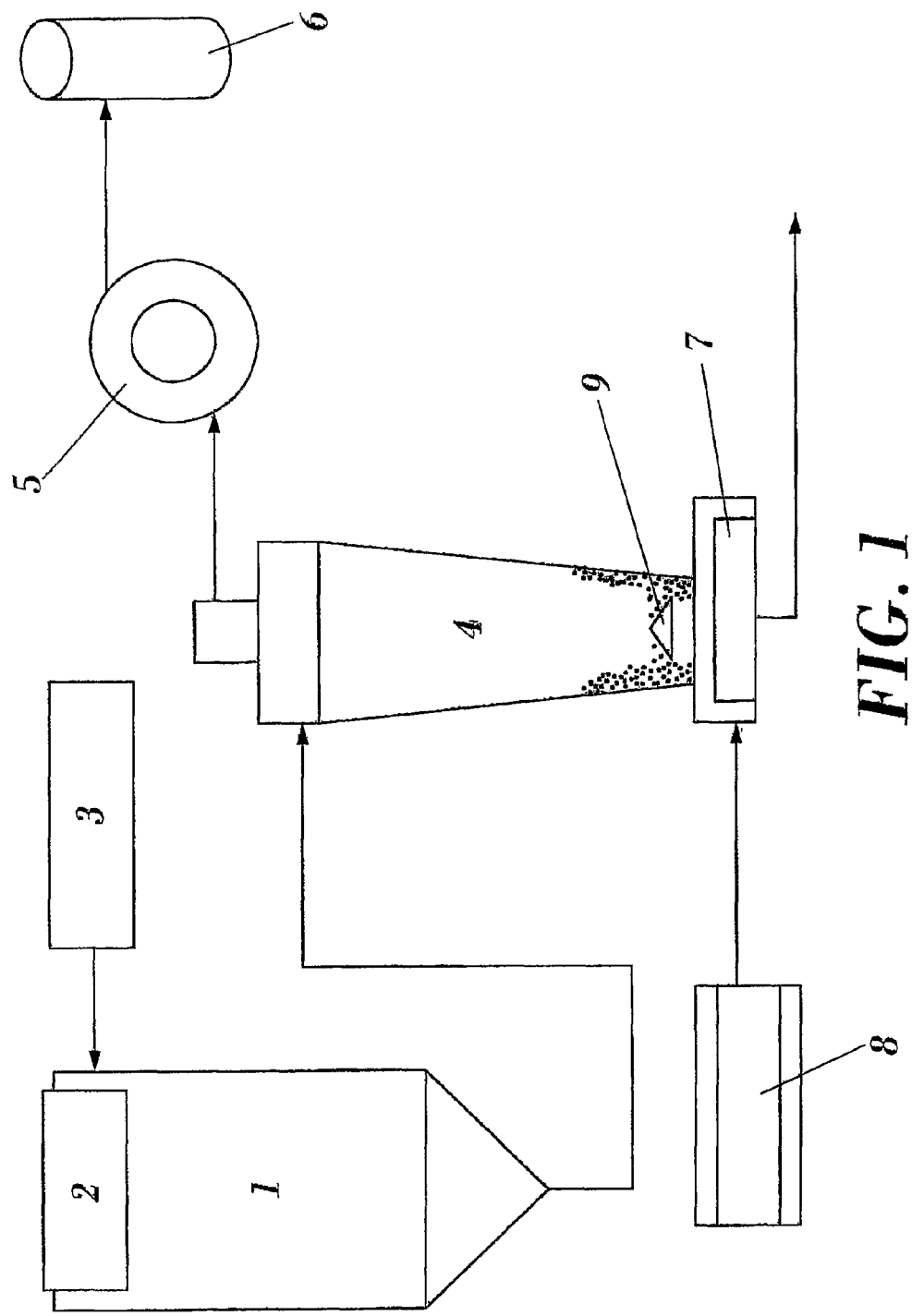
FIG. 1.—Portrays a schematic view of the elements of the facility which intervene in the production of powdered still slops.
Figure 2:
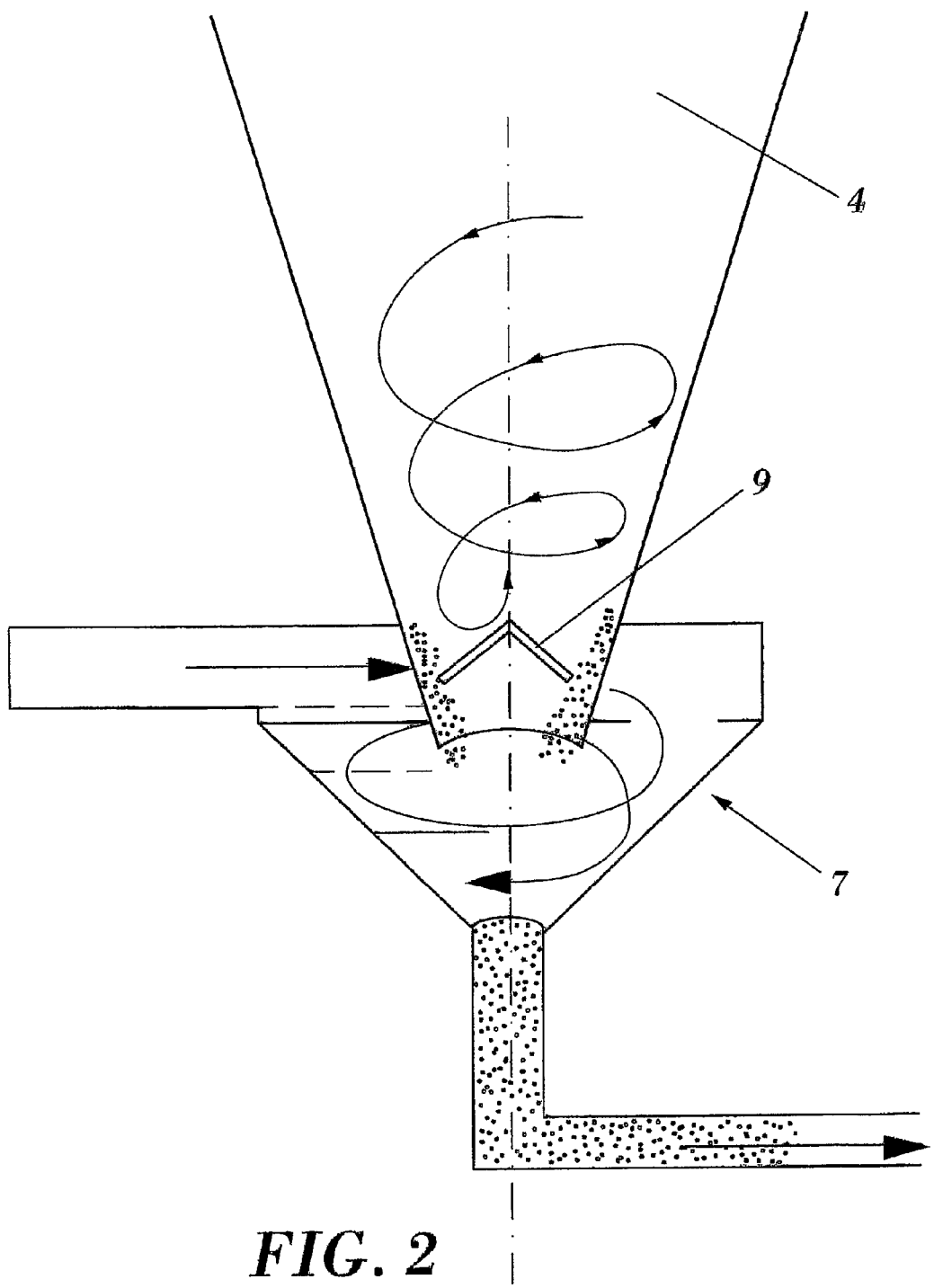
FIG. 2.—Portrays a schematic frontal view of the cyclone-duct assembly portrayed in the previous drawing.
Figure 3:
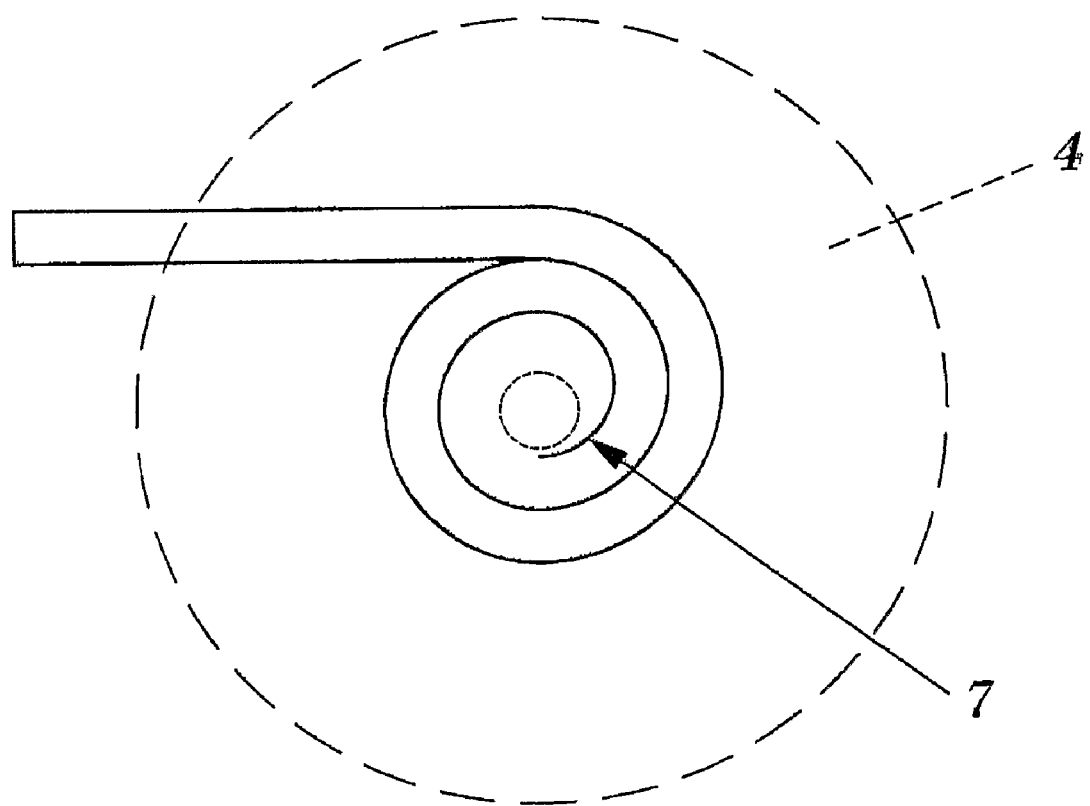
FIG. 3.—Portrays a plan view of the duct in its centralised position with regard to the cyclone outlet aperture, portrayed by a dotted line.

In FIG. 1 it may be seen that the installation is comprised fundamentally of at least:

one dryer for the concentrated liquid still slops (1)

one atomisation or pulverisation device (2) or similar, which transforms the flow of liquid still slops into a spray of very fine particles or droplets one device (3) for heating the air which is drawn into the dryer (1) and which will dry the fine droplets of still slops, converting them into a powder one collecting cyclone (4) for the powder produced in the dryer (1) and which receives a hot air draught which draws the aforementioned powder one fan (5) which generates the flow of hot air and which absorbs the same via the cyclone (4), the dryer (1) and the air heater (3)

one flue (6) which evacuates the hot air to the atmosphere (it must feature a heat recovery device)

one air valve (7) located at the lower aperture of the cyclone and which is a circular-shaped duct configured like a snail or a logarithmic spiral, which features an external inlet through which cool, dry air enters one device (8) which produces air with a low relative humidity, in the range of 15% to 40%, and at a temperature in the range of 18° C. to 35° Centigrade one inverted conical disc (9) or "Chinese hat" located at the base of the cyclone, slightly separated from the wall in order to allow the passage of the powdered still slops, and over whose upper side air is directed; this being guided towards the central axis of the collecting cyclone (4) to be sent subsequently towards the flue (6).

The invention claimed is:

1. A facility for the production of powdered still slops, comprised of a collecting cyclone featuring an inlet associated with a dryer for concentrated liquid still slops, from which the powder produced is drawn within a hot air draught towards the collecting cyclone which also features an upper outlet for discharging the air; and a lower outlet aperture, characterised in that it features around the lower outlet aperture a device of a circular configuration, shaped like a snail or a logarithmic spiral, which features an inlet through which cool, dry air from a cool, dry air generator enters, and a central outlet which coincides with the lower outlet aperture of the collecting cyclone, generating a suction effect on the powder which falls, drawn to a discharge aperture located below the central outlet, from where it is directed for storage, driven by the dry air.

2. The facility for the production of powdered still slops, as claimed in claim 1, wherein in the vicinity of the lower outlet aperture of the collecting cyclone there is a centrally located inverted conical disc, slightly separated from the cyclone wall so that the powder may slide down towards the lower outlet aperture, and over whose upper side air is directed; this being guided towards the central axis of the collecting cyclone to be sent subsequently towards the flue.

3. The facility of claim 1, wherein said collecting cyclone is connected to a fan which generates the flow of hot air.

4. The facility of claim 1, wherein said facility further comprises a flue for evacuating hot air to the atmosphere.

5. A procedure for obtaining powdered still slops, comprising the following steps:
   providing a facility for the production of powdered still slops acceding to claim 1;
   Introducing into the cyclone the first hot-air draught, carrying powdered still slops; and
   introducing into the cyclone the first hot-air draught, carrying powdered still slops: and
   introducing via the inlet of the lower aperture of said cyclone a second whirlpool-like draught of dry, cool air which generates a downward suction effect counter to the upward suction effect of the cyclone, causing the falling of the powder, which is drawn by this second air draught for storage.

6. The procedure of claim 1, wherein the second air draught is inputted at a temperature of between 18° C. and 35° C., with a Relative Humidity of approximately 15% to 40%.

\* \* \* \* \*